(12) United States Patent
Jezek, Jr. et al.

(10) Patent No.: US 11,080,784 B2
(45) Date of Patent: Aug. 3, 2021

(54) MARKET DATA REDACTION TOOLS AND RELATED METHODS

(71) Applicant: TRADING TECHNOLOGIES INTERNATIONAL INC., Chicago, IL (US)

(72) Inventors: Raymond J. Jezek, Jr., Elgin, IL (US); Scott F. Singer, Green Oaks, IL (US)

(73) Assignee: Trading Technologies International, Inc., Chicago, IL (US)

( * ) Notice: Subject to any disclaimer, the term of this patent is extended or adjusted under 35 U.S.C. 154(b) by 1060 days.

(21) Appl. No.: 14/975,460

(22) Filed: Dec. 18, 2015

(65) Prior Publication Data
US 2017/0178234 A1    Jun. 22, 2017

(51) Int. Cl.
*G06Q 40/04*    (2012.01)

(52) U.S. Cl.
CPC .................... *G06Q 40/04* (2013.01)

(58) Field of Classification Search
USPC ........................................................ 705/37
See application file for complete search history.

(56) References Cited

U.S. PATENT DOCUMENTS

| | | |
|---|---|---|
| 6,271,839 B1 | 8/2001 | Mairs et al. |
| 7,454,708 B2 | 11/2008 | O'Neal et al. |
| 7,765,483 B2 | 7/2010 | Schmieder et al. |
| 2002/0138389 A1 | 9/2002 | Martone et al. |
| 2003/0041000 A1 | 2/2003 | Zajac et al. |
| 2005/0015324 A1 | 1/2005 | Mathews et al. |
| 2006/0031779 A1* | 2/2006 | Theurer ............... G06F 3/1454 715/781 |
| 2008/0154764 A1 | 6/2008 | Levine et al. |
| 2008/0162378 A1 | 7/2008 | Levine et al. |
| 2009/0132316 A1 | 5/2009 | Florance et al. |
| 2009/0271713 A1* | 10/2009 | Stull ...................... G06Q 10/10 715/753 |
| 2010/0076906 A1 | 3/2010 | Eubank et al. |
| 2010/0076907 A1 | 3/2010 | Eubank et al. |

(Continued)

OTHER PUBLICATIONS

International Search Report and Written Opinion for International Application No. PCT/US2015/065499, dated Feb. 9, 2016.

*Primary Examiner* — Jason Borlinghaus
*Assistant Examiner* — Ambreen A Alladin

(57) ABSTRACT

An example method includes receiving, at a first computing device, market data related to a plurality of tradeable objects. The example method includes displaying, via an interface, the received market data via at the first computing device. The interface is based on an interface object model including a plurality of data components corresponding to the received market data. The example method includes receiving an input selection to share the interface with a second computing device and generating a transfer object model based on the interface object model in response to the receipt of the input selection. The example method includes identifying a first group of the plurality of data components included in the transfer object model and redacting the first group of the plurality of data components corresponding to the received market data components. The example method includes transmitting the redacted transfer object model to the second computing device.

9 Claims, 13 Drawing Sheets

(56) References Cited

U.S. PATENT DOCUMENTS

| | | |
|---|---|---|
| 2010/0138357 A1 | 6/2010 | Mufti-Bey |
| 2010/0218136 A1 | 8/2010 | Tyulyaev |
| 2010/0293110 A1 | 11/2010 | Rosenthal et al. |
| 2011/0173114 A1 | 7/2011 | Annunziata |
| 2012/0016868 A1 | 1/2012 | Wagenblatt |
| 2016/0182602 A1* | 6/2016 | Cordonnier .......... G06F 3/0482 715/740 |

* cited by examiner

FIG. 4A

| | W/O | Bid | Value | Ask | LTQ/LTP |
|---|---|---|---|---|---|
| -50 | | | 96700 | | |
| | | | 96625 | | |
| 12793 | | | 96600 | | |
| | | | 96575 | | |
| 5 | | | 96550 | | |
| 1  5 | | | 96525 | 5 | |
| 10  20 | | | 96500 | | |
| 50  100 | | | 96475 | 65 | |
| CLEAR | | | 96450 | 69 | |
| | S 0 W 4 | | 96425 | 96 | |
| | | | 96400 | 32 | 9 |
| | | | 96375 | 267 | |
| | B 0 W 10 | 151 | 96350 | | |
| | | 129 | 96325 | | |
| | | 80 | 96300 | | |
| | | 48 | 96275 | | |
| | | 30 | 96250 | | |
| | | | 96200 | | |
| | | | 96175 | | |
| | | | 96150 | | |

FIG. 4B

| Bid | Value | Ask |
|---|---|---|
| | 96700 | 21 |
| | 96625 | |
| | 96600 | 17 |
| | 96575 | 96 |
| | 96550 | 63 |
| | 96525 | 41 |
| | 96500 | |
| | 96475 | |
| 56 | 96450 | |
| 24 | 96425 | |
| 37 | 96400 | |
| 45 | 96375 | |
| 151 | 96350 | |
| 129 | 96325 | |
| 80 | 96300 | |
| 48 | 96275 | |
| 30 | 96250 | |
| | 96200 | |
| | 96175 | |
| | 96150 | |

MARKET DATA REDACTION TOOLS AND RELATED METHODS

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

Information received from the electronic exchange by a trading device includes a price feed, or a market data feed containing real-time information about one or more tradeable objects at the market (e.g., stocks, options, futures contracts). Market data in the price feed includes, for example, prices, quantities, and contract information for the one or more tradeable objects. A user of the trading device can view the price information via a graphical user interface (GUI) displayed on a screen of the trading device.

In some examples, the user may wish to share or simulcast market data displayed on the screen of the user's trading device, to another device used by, for example, another user. However, certain market data may have restricted user access in view of limitations set by the electronic exchange. For example, certain price feed data may be accessed only if a user is a paid subscriber of the price feed provided by the exchange. Thus, price feed distribution rules determine the market data that can be shared between users via respective trading devices. Automatic redaction of restricted or sensitive price feed data in response to a user input to share the user's screen with another user device provides for an efficient approach to sharing data between trading devices that accounts for price feed distribution rules.

BRIEF DESCRIPTION OF THE FIGURES

Certain embodiments are disclosed with reference to the following drawings.

FIGS. 4A to 4E illustrate block diagrams representative of example trading interfaces in which certain embodiments may be employed.

Figure 1:
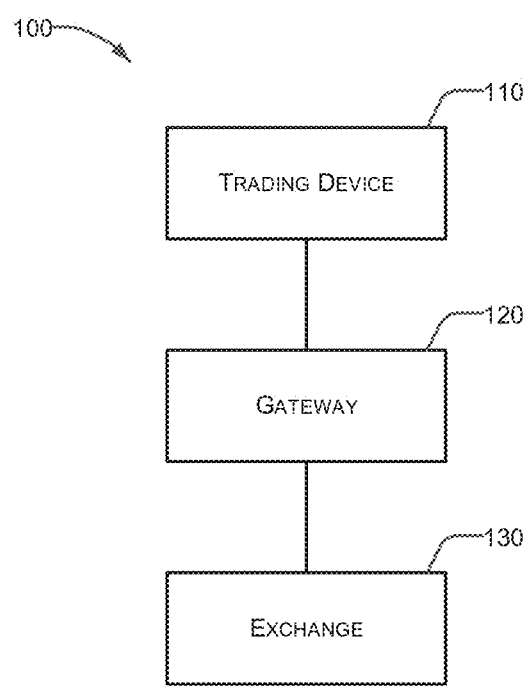
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

The disclosed embodiments relate to distribution of market data between trading devices and, more particularly, to market data redaction tools and related methods.

Electronic exchanges offer market data feeds that include information about tradeable objects at the exchange. For example, data elements or fields in the feed can include price, quantity, and contract information for one or more tradeable objects (e.g., stocks, options, futures, etc.). Although certain market data may be publicly available, an exchange may restrict public access to other market data. In some examples, a user is required to have a subscription (e.g., a paid subscription) to access all or some of the market data provided by the exchange via the feeds. For example, an exchange may require a subscription to receive substantially real-time price feeds whereas older price feed data may be available without a subscription.

A user (e.g., a subscriber) can view the market data feed via a graphical interface presented on a display screen of a trading device. Based on the market data, the user may place orders to buy one or more tradeable objects, offer one or more tradeable objects for sale, and/or generally monitor the status of one or more tradeable objects via the display screen of the trading device. In some examples, the user may wish to share the market data the user is viewing on his display screen with another user (e.g., via a display screen of the other's user trading device). For example, a user may wish to share the market data with another user as part of developing a trading strategy and/or advising the other user with respect to buying or selling tradeable objects.

In some examples, a first trading device can broadcast, multicast, and/or unicast (hereinafter referred to together as simulcast) an interface viewable via the display screen of the first trading device to another trading device. As a result of the simulcast, the interface is viewable on a display screen of the second trading device. Thus, the interface is viewable at the first trading device and the second trading device. In some examples, the interface is substantially identically replicated at the second trading device.

Although the interface of the first trading device can be substantially identically viewed at the second trading device, in some examples, the user of the second trading device is not authorized to view the market data that the user of the first trading device (e.g., the subscriber) is authorized to view. For example, the user of the second trading device may not have a subscription to the market data feed at the exchange. Thus, sharing all of the market data that is viewable by the user of the first trading device with the user of the second trading device would violate the restrictions or data feed distribution rules associated with the exchange subscription. In other examples, the exchange or individuals such as a fund administrator or the user of the first trading device may selectively define certain market data elements as restricted or sensitive data elements and, thus, prevent such data elements from being shared with other users. For example, the user of the first computing device may selectively restrict profit or loss amounts from being shared with the user of the second computing device. As another example, the exchange can selectively define market sharing rules on a subscription-, a device-, and/or a user-basis.

Examples disclosed herein provide market data redaction and/or masking tools and methods that selectively redact or otherwise mask market data in view of data feed distribution rules in advance of sharing an interface between trading devices. In particular, in response to a command to share the interface between a first and a second trading device, the example embodiments disclosed herein automatically make a copy of the interface and identify data fields containing components or elements of the market data feed in the copy that are associated with one or more access restrictions. Based on the identification of one or more data fields as being restricted or sensitive data fields, the example embodiments disclosed herein automatically redact the restricted data fields (e.g., the market data components in the respective data fields) such that the restricted data fields are modified so as not to be viewable from the second trading device.

The automatic identification of the restricted data fields can be based on, for example, attributes that define style information in a HyperText Markup Language (HTML) interface. The HTML attributes can be defined as part if the HTML interface and/or may be defined as part of a cascading style sheet (CSS). In certain embodiments, the HTML attributes can be defined as part of an internal cascading style sheet that is defined and inline with the HTML interface. In other embodiments, the HTML attributes can be defined as part of an external cascading style sheet that is defined and referenced by multiple HTML interfaces. The HTML attributes identify or tag data such as one or more market data fields to allow the data fields to be found within the interface. For example, HTML attributes may identify certain data fields as containing data being formatted as prices. The example embodiments disclosed herein automatically identify the price data fields based on the HTML attributes by scanning or searching the copy of the interface for the attributes. Based on one or more rules associated with the exchange subscription or defined by the user of the first trading device, the example embodiments disclosed herein determine that certain data fields are restricted from being shared with the user of the second trading device. In some examples, the disclosed embodiments determine authorizations associated with the user of the second trading device as part of identifying the data fields as restricted data fields.

To redact the sensitive information, the example embodiments disclosed herein modify one or more of a presentation style or the content of the restricted data fields. For example, content in a restricted data field can be masked or blocked out such that the content will not be visible when displayed on the screen of the second trading device. In other examples, content that may be colored to indicate profits and losses (e.g., displayed as green and red colored font) may be modified so as not to include any color indicators. As another example, the content can be substituted with older data that is available without a subscription (e.g., not real-time data).

In the disclosed embodiments, the copy of the interface with the redactions is transmitted to the second trading device. The interface displayed via the second trading device contains the redactions of the restricted or sensitive data. Thus, the user of the second trading device does not see the restricted or sensitive data. However, the interface at the first trading device is not affected in that the interface displayed via the first trading device continues to display the market data, including the data identified as sensitive data, without modification or masking. Put another way, the user of the first trading device continues to view the unredacted or unmodified interface. Thus, the disclosed embodiments efficiently redact sensitive information from the copy of interface at the first trading device before transferring the copy to the second trading device and without affecting the content viewable at the first trading device. Accordingly, the example embodiments disclosed herein account for restrictions in the availability of market data while providing for shared screen access between trading devices.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Certain embodiments provide a method including receiving, at a first computing device, market data related to a plurality of tradeable objects offered at an electronic exchange. The example method includes displaying, via an interface associated with the first computing device, the received market data via at the first computing device. The interface is based on an interface object model including a plurality of data components corresponding to the received market data. The example method includes receiving, at the first computing device, an input selection to share the interface with a second computing device. The example method includes generating, at the first computing device, a transfer object model based on the interface object model in response to the receipt of the input selection. The example method includes identifying, at the first computing device, a first group of the plurality of data components included in the transfer object model. The example method includes redacting, at the first computing device, the first group of the plurality of data components corresponding to the received market data components. The example method includes transmitting the redacted transfer object model to the second computing device.

Certain embodiments provide a first computing device, including a processor, configured to receive market data related to a plurality of tradeable objects offered at an electronic exchange. An interface associated with the first computing device is configured to display the received market data. The interface is based on an interface object model including a plurality of data components corresponding to the received market data. In response to receiving an input selection to share the interface with a second computing device generated at the first computing device, the first computing device is to: generate a transfer object model based on the interface object model in response to the receipt of the input selection; identify a first group of the plurality of data components included in the transfer object model; redact the first group of the plurality of data components corresponding to the received market data components; and transmit the redacted transfer object model to the second computing device.

Certain embodiments provide a tangible computer-readable storage medium comprising instructions that, when executed, cause a computing device to at least receive market data related to a plurality of tradeable objects offered at an electronic exchange. The instructions cause the computing device to display the received market data in an interface associated with the first computing device. The interface is based on an interface object model including a plurality of data components corresponding to the received market data. In response to receiving an input selection to share the interface with a second computing device generated at the computing device, the instructions cause the computing device to: generate a transfer object model based on the interface object model in response to the receipt of the input selection; identify a first group of the plurality of data components included in the transfer object model; redact the first group of the plurality of data components corresponding to the received market data components; and transmit the redacted transfer object model to the second computing device.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
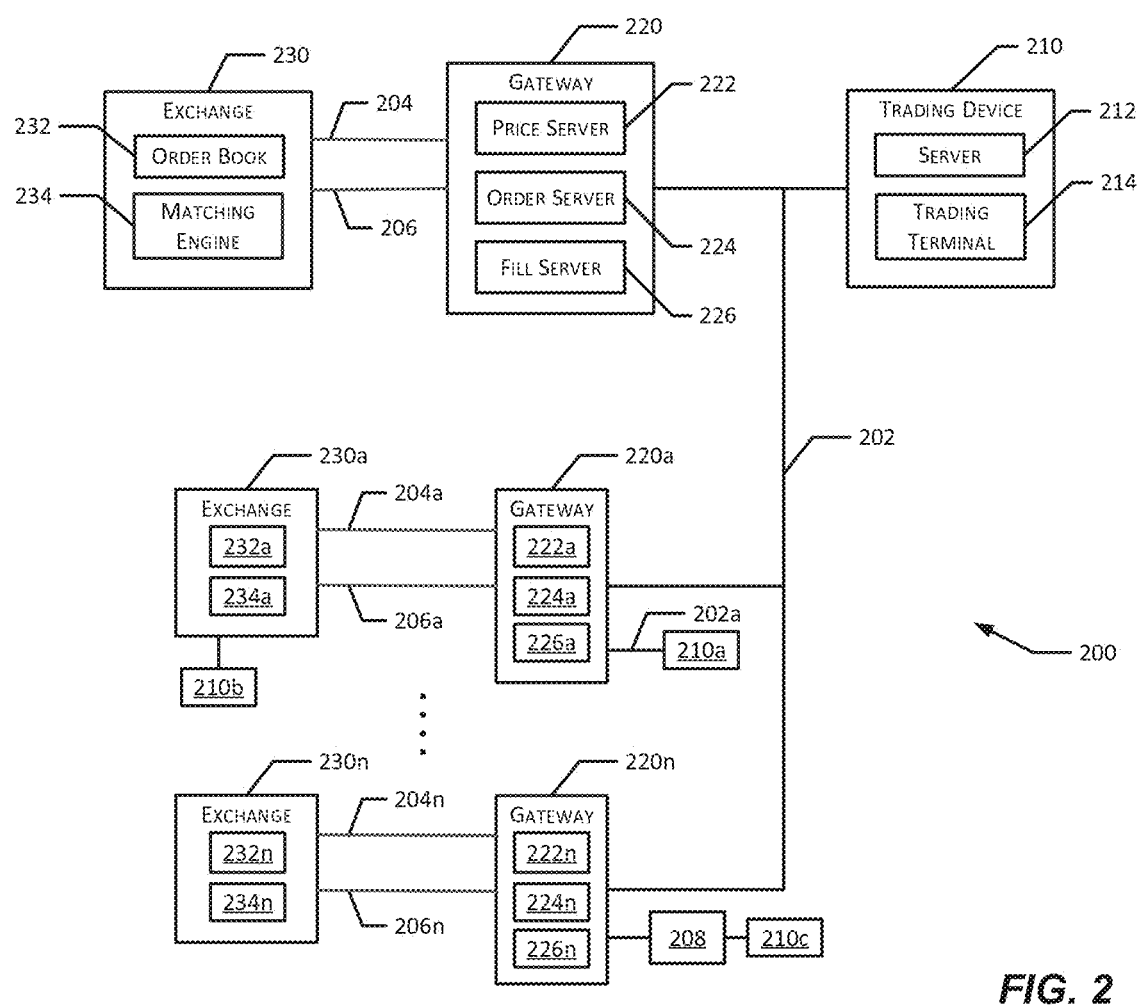
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
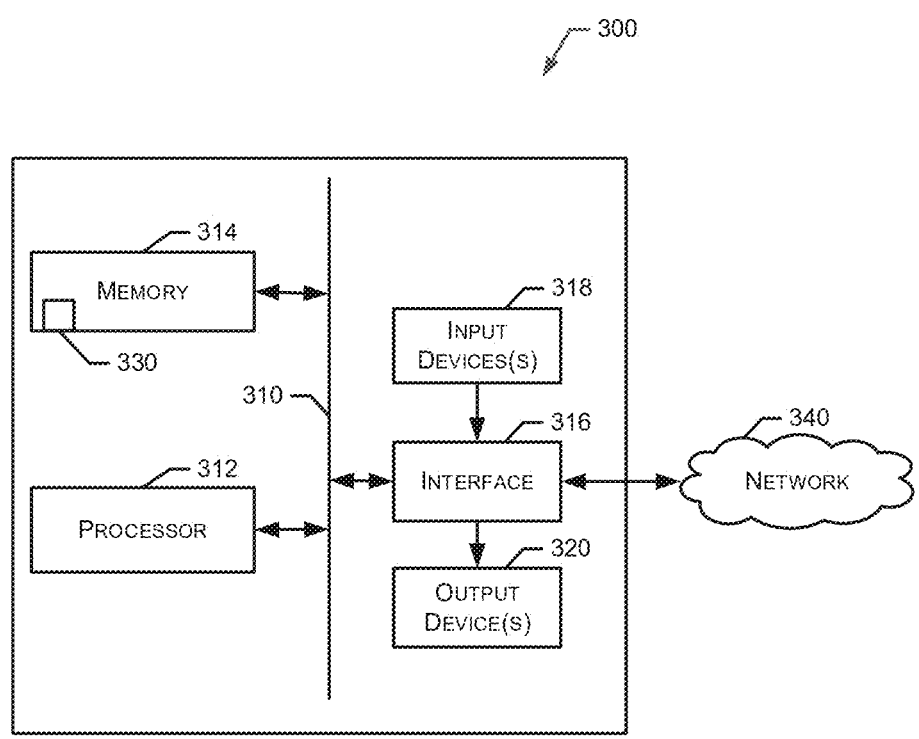
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Trading Interface

FIG. 4A illustrates an example trading interface 400 in which certain embodiments may be employed. The example trading interface 400 shows market data for a tradeable object at a first point in time. While the following examples are described in conjunction with the example electronic trading system 200 of FIG. 2, the examples disclosed herein may be implemented in other electronic trading systems, such as the example trading system 100 of FIG. 1.

As described above in conjunction with FIG. 2, the trading device 210 receives market data related to one or more tradeable objects from the exchange 230 and/or the exchanges 230a-230n through the gateway 220 and/or the gateways 220a-220n, respectively. The trading device 210 provides a trading application including trading tools to process and/or organize the market data and provide the example trading interface 500. Trading tools include, for example, MD TRADER®, X_TRADER®, ADL®, AUTOSPREADER®, and AUTOTRADER™, each provided by Trading Technologies. The trading device 210 provides the trading interface 400 to enable a user to view market data and communicate trade orders and trade actions with an electronic exchange.

In the illustrated example of FIG. 4A, the trading interface 400 includes a bid column 402, a value column 404, and an ask column 406. The trading interface 400 further includes a working order (W/O) column 408 and a last traded quantity (LTQ)/last traded price (LTP) column 410. The trading interface 400 may include other columns such as an estimated position in queue (EPIQ) column, a single combined bid/ask column, a user-defined indicator column, an inside market indicator column, and/or any other column for providing indicators. The trading interface 400 also includes rows such as row 412. The columns intersect with the rows to define cells such as cell 414. In other embodiments, different orientations other than vertical columns may be used (e.g., horizontal and diagonal arrangements).

In the illustrated example, bid indicators representing the bid quantities of the tradeable object are displayed in the bid column 402, value indicators corresponding to value levels are displayed in the value column 404, and ask indicators representing the ask quantities of the tradeable object are displayed in the ask column 406. A bid quantity is a quantity available on the bid side of the tradeable object at a given value level. The value levels can be configured to represent prices, net change, derivatives of price, consolidated prices, synthetic tradeable object pricing, spread pricing, and/or other representations of value. The ask quantity is a quantity available on the ask side of the tradeable object at a given value level. The indicators are not limited to numerical values and can include any type or combination of indicator or symbol to illustrate the available quantity without providing a specific numeric value. For example, the indicators may include text, icons, colors, lines, and/or other graphical representations. In one example, the indicators may represent a range of quantity available at particular value levels in place of specific, and frequently changing, quantity values. In another example, the relative size of indicators may proportionally represent the quantity available.

Trading interfaces, such as the trading interface 400, may include indicators to identify the inside market. Examples of inside market indicators include a best bid price indicator representing the highest available bid price, a best ask price indicator representing the lowest available ask price, and/or an indicator representing a range between the highest available bid price and the lowest available ask price. As shown in FIG. 4B, the inside market indicator may highlight and identify the range 458 of value levels between the highest available bid price of "96450" and the lowest available ask price of "96525". Inside market indicators may be displayed within the trading interface to identify specific value level(s) in the value column 404. For example, a best bid price indicator may be displayed in a cell containing a bid quantity indicator and corresponding to a value level that reflects the best bid price. As another example, a best ask price indicator may be a color or symbol combined with an ask quantity indicator in the ask column 406 in a cell corresponding to a value level that reflects the best ask price. As another example, inside market indicators may be displayed at value levels within the value column 404 that reflect the best bid price and the best ask price. The inside market indicators can include any type or combination of indicator or symbol (e.g., the indicators may include text, icons, colors, lines, and/or other graphical representations).

In certain embodiments, the inside market indicators may be provided by the presence of a quantity indicator. For example, the presence of the best bid quantity indicator, independent of the quantity value displayed at any given point in time, in the bid column may be, in effect, the best bid price indicator. Thus, the existence of a quantity indicator at the highest value level in the bid column is the best bid price indicator. To be clear, the value of the bid quantity indicator is not part of the best bid price indicator in this example. Rather, the existence of the bid quantity itself as the highest one in the column is the best bid price indicator. As shown in FIG. 4A, the presence of the bid quantity indicator "151" at the highest value level in the bid column at the price of "96350" is the best bid price indicator 460. Similarly, the presence of the ask quantity indicator "267" at the lowest value level in the ask column at the price of "96375" is the best ask price indicator 462.

From the user's perspective, the trading interface 400 may present and display indicators, such as inside market and LTP/LTQ indicators, in a manner that conveys the appearance of movement relative to the value column 404. For example, the manner in which the trading interface alters the position of the best bid price indicator and the best ask price indicator relative to the value levels within the value column may allow the user to perceive changes in both the speed and direction of trading within a market. The trading interface 400 updates based on received market data. For example, the trading interface 400 moves the best bid price indicator 460 relative to the value column 404 when the received market data includes a quantity at a new highest bid price. As another example, the trading interface 400 moves a LTP indicator 464 (shown in the LTQ column 410 of FIG. 4A) relative to the value column 404 when the received market data includes a new last traded price.

The trading interface 400 shown in FIG. 4A depicts and identifies the inside market via the best bid price indicator 460 aligned with the highest available bid price and the best ask price indicator 462 aligned with the lowest available ask price at a first point in time. For example, the best bid price indicator 460 is moved to reflect the change in the best bid price from "96350" (FIG. 4A) to "96450" (FIG. 4B). Similarly, the best ask price indicator 462 is moved to reflect the change in the best ask price from "96375" to "96525". By observing the movement of the inside market indicators relative to the value column 404 in the described manner, the user can quickly perceive that the market is trading higher.

Moreover, as illustrated in the trading interface 400 shown in FIG. 4A, the bid quantity indicator "151" is at the best bid price "96350" and the ask quantity indicator "267" is at the best ask price "96375". At the second point in time, the displayed quantity indicators are updated to reflect new quantities available. As shown in FIG. 4B, the bid quantity indicator "56" is at the best bid price "96450" and the ask quantity indicator "41" is at the best ask price "96525". Although the quantity values have changed, it is the presence of the bid quantity indicator at the highest value level in the bid column and the presence of the ask quantity indicator at the lowest value level that are the inside market indicators.

The movement of the indicators relative to the value column 404 may be implemented in a variety of ways. In one example, movement of an indicator includes repositioning the indicator from one location to another location. In another example, movement of an indicator includes removing the indicator at one location and replacing it with a new indicator at another location, which as user may perceive as the appearance of movement.

When quantity information is displayed in relation to the value column 404 and the market moves up or down, the inside market indicators can be said to "move" up or down from the user's perspective in relation to the value column 404 to reflect a new highest bid price or a new lowest ask price. For example, when the quantity indicators are represented with numerical values and the inside market indicators are provided by the presence of the highest bid quantity indicator and lowest ask quantity indicator, the exact numeric value representing the quantity at the best bid price or the best ask price need not move or provide the appearance of movement. The quantity indicators, in this particular example, at those particular price levels may have changed, but they do not actually move—it is the best bid indicator that has "moved."

The value indicators in the value column 404 may be repositioned. A selected value indicator may be repositioned to a designated location and other value indicators are repositioned relative to the selected value indicator. The selected value indicator may be based on, for example, a user selection or market related values such as the highest bid price or lowest ask price, LTP, and a calculated average of the best bid and best ask prices. The designated location may be a pre-determined location or a location defined by a user. In one configuration, in response to the repositioning command, the selected value indicator may be moved to the designated location corresponding to the middle of the display (e.g., to a location corresponding substantially to the midpoint of the length of the value column 404). In another configuration, in response to the repositioning command, the selected value indicator can be displayed at a user-identified or pre-defined position within the display.

The value indicators in the value column 404 may be repositioned in response to various commands or triggering conditions. In one example, the value indicators displayed in the value column 404 may be repositioned in response to a manual repositioning command. In another example, the value indicators displayed in the value column 404 may be repositioned automatically in response to an automatic repositioning command. The automatic repositioning command may, for example, be received upon detection of a triggering condition. Some examples of a triggering condition include: expiration of an alarm or timer; a determination that the inside market is, or may be, moving off the display; a determination that the inside market has exceeded an upper threshold or a lower threshold; an event in another trading interface; a market event relating to the same or a different tradeable object; a user-defined event; and/or a determination that a value exceeds a threshold.

In some examples, an indicator based on market data (such as best bid, best ask, LTP) may be displayed at the same fixed location in the trading interface 400. For example, the best bid indicator in the bid column 402 may be displayed at a specified fixed location. The fixed location may be pre-determined or defined by a user. For example, the best bid indicator and/or the best ask indicator may, for example, be maintained at the center of the display, at the top of the display, at the bottom of the display or any designated location.

In the illustrated example, the values, which are prices, are displayed without decimal points (which may be a format or convention expected by a user) and in descending order from a top to a bottom of the value column 404 in the orientation of FIG. 4A. In other examples, the prices are listed in other orders (e.g., ascending order from top to bottom) and/or formats (e.g., with decimal points, fractions, in scientific notation, and/or any other format).

In the illustrated example, the indicators in the bid column 402 and the ask column 406 are updated to indicate quantity changes at each value level identified along the value column 404. For example, values of the ask quantities and/or the bid quantities may increase or decrease due to order quantities being added, deleted or matched at each value level. The indicators may be updated based on a timer and/or in response to new data being received, for example.

In some examples, the trading interface 400 includes additional and/or different information. In the illustrated example, the trading interface 400 also displays a net price change 416 of the tradeable object over a given amount of time (e.g., since the market opened on a given day). The trading interface 400 also includes a total volume 418 of the tradeable object (e.g., a number of lots that have been traded). Other embodiments may include different and/or additional information.

The trading interface 400 also enables the user to specify parameters for a trade order. In the illustrated example, the trading interface 400 includes a quantity field 420. The quantity field 420 displays a quantity (e.g., 5) for an order that the user will send to market, and the user may adjust the quantity by selecting (e.g., via a mouse) one of a plurality of buttons 422 adjacent the quantity field 420 or entering a new value into the quantity field 420. If the user selects a button 424 labeled "CLEAR" in the illustrated example, the quantity field 420 is cleared (e.g., the quantity displayed in the quantity field 420 is adjusted to be zero).

The trading interface 400 further enables the user to enter an order to buy or sell a tradeable object via an order entry area configured to receive a selection and in response initiate placement of the order. Selection of an order area may be by a single action of an input device such as a single click, a double click, or a multi-touch gesture. Initiating placement of an order may include preparing a message to send an order to an exchange or sending an order to an electronic exchange. The trading interface 400 may include multiple order entry areas. The trading interface 400 may request that a user confirm an order to be placed prior to sending it.

Order entry areas may overlap or encompass one or more regions of a trading interface. For example, an order entry area may overlap all or part of the cells making up a row. As another example, an order entry area may overlap all or part of the cells in a column such as the bid column, ask column or value column. In another example, an order entry area may overlap a cell and a region outside of the cell. In certain embodiments, a trading interface may include a first order entry area overlapping first cell and a second order entry area overlapping a second cell. In certain embodiments, a first order entry area overlaps a first cell and a portion of a second cell, and a second order entry area overlaps a portion of the second cell and a third cell. In certain embodiments, order entry areas may encompass other regions of the trading interface.

Each order entry area may align with a value level. For example, an order entry area may be aligned with one of the value levels making up the value column 404. In another example, an order entry area may be independent of and not aligned with a value level.

An order entry area may be linked to other elements of the trading interface 400. For example, an order entry area may be linked to a particular value level making up a value column by specifying a value level followed by specifying an order entry area. Subsequently, selection of the linked order entry initiates placement of the order based on the linked value. As another example, selection of a cell associated with a particular value level may link a pre-defined order entry area to the particular value level.

Upon selection of an order entry area to initiate placement of an order, one or more parameters of the order may be determined based on the selected order entry area. Order parameters may include order price, order quantity, order side, and/or order type. Other order parameters may be specified. Values for the parameters may be default values, preconfigured values, values set based on the location of the selection within the order entry area, values set based on the location of the order entry area, values set based on the method of the selection (e.g., a left click, a right click, a keyboard entry and a double click).

The manner in which the selection of an order entry area is made may affect the type of order or the way in which placement of an order is initiated. For example, selection within a row configured as an order entry area may include correlating the position of the selection to a specific cell or column arranged and aligned relative to the order entry area. The type of single action provided via the input device may further specify the selection. For example, if the user initiates a single action corresponding to a right click within an order entry area aligned with a portion of the row corresponding to a cell in the value column, then the selection may initiate placement of a buy order. Similarly, if the user initiates a single action corresponding to a left click over a portion of the row corresponding to a cell in the value column, then the selection may initiate placement of a sell order. As another example, selecting an order entry area encompassing the cells in the bid column may initiate placement of a buy market order when the selection is a single point touch applied to a touch sensitive interface and a buy sweep order when the selection is a two point touch to the touch sensitive interface.

Figure 4C:
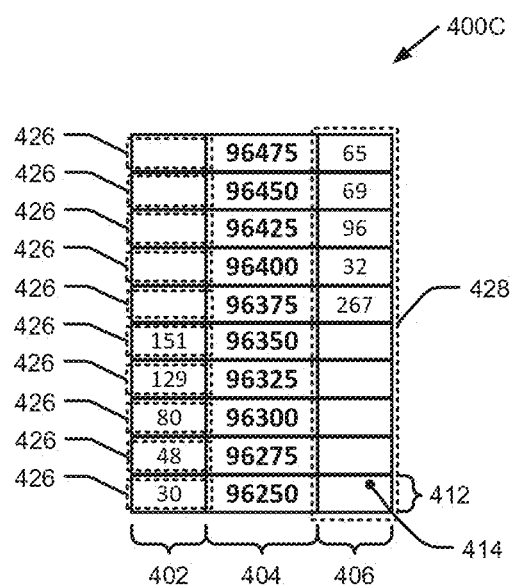
Figure 4D:
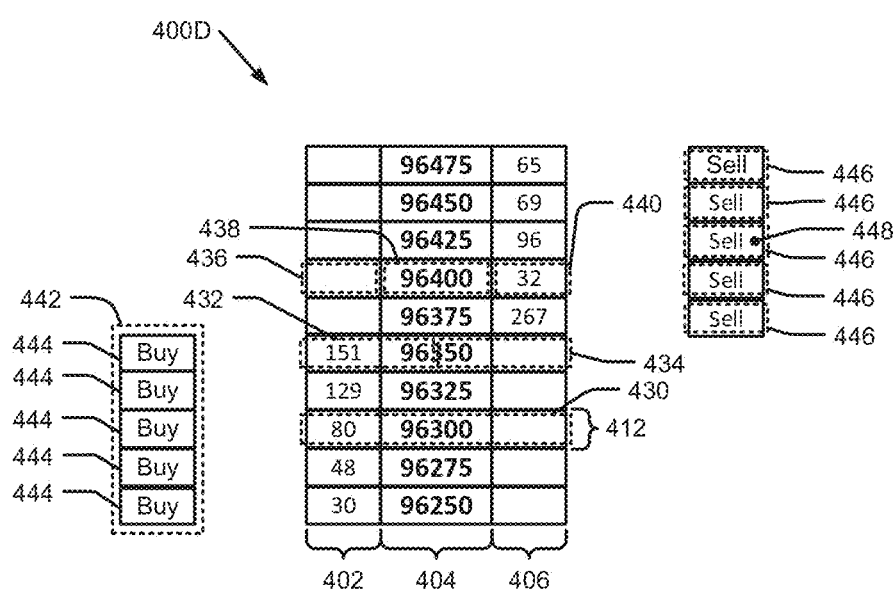
Figure 4E:
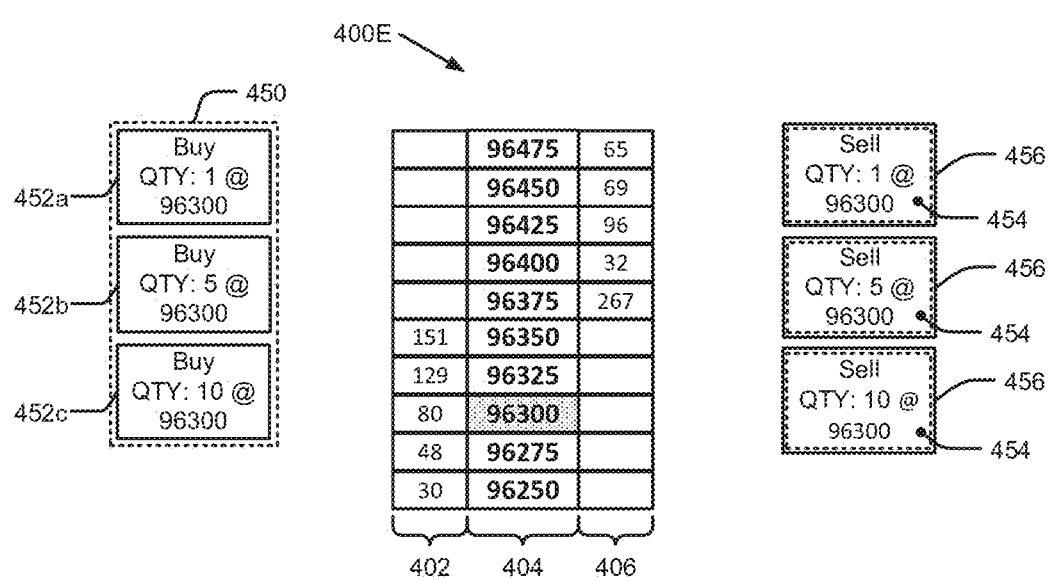

FIGS. 4C to 4E illustrates examples of order entry area configurations that may be utilized to initiate placement of an order. FIG. 4C illustrates one configuration of a trading interface (identified as trading interface 400B) including order entry areas overlapping each cell making up a column. For example, selection of a particular order entry area 426 in bid column 402 may initiate placement of an order to buy a default quantity at the value level aligned with the selected order entry area. In operation, when the user selects an order entry area 426 overlapping the cell containing the bid quantity "80" in the illustrated example, the trading device 210 sends an order to sell a default quantity of 5 displayed in the quantity field 420 (see FIG. 4A) at a price of "96300".

FIG. 4C further illustrates another configuration of the trading interface 400C including an order entry area overlapping an entire column. For example, selection within a portion of the order entry area 428 overlapping the ask column 406 initiates placement of an order to sell a default quantity at the value level corresponding to the selected portion of the order entry area. In operation, when the user selects within the order entry area 428 at a location corresponding to the cell displaying the ask quantity "69" in the illustrated example, the trading device 210 sends an order to buy a default quantity of 5 displayed in the quantity field 420 at a price of "96450".

FIG. 4D illustrates another configuration of a trading interface (identified as trading interface 400D) including order entry areas overlapping cells defined within one or more of the columns in the same row. For example, an order entry area 430 may overlap a row 412 containing cells within each of the columns 402 to 406. In operation, selection within any portion of the order entry area 430 overlapping the row 412 initiates placement of an order to either buy or sell a default quantity at a price of "96300". Determination of the side (e.g., buy or sell) of the order may be based on the method of the selection (e.g., a left click to initiate a buy order and a right click to initiate a sell order) and/or the position at which the selection was made (e.g., within a portion of the order entry area overlapping the buy column 402, within a portion of the value column 404 closer to the ask column 406. In another example, a first order entry area 432 overlaps a first cell in column 402 and part of a second cell in column 404, and a second order entry area 434 overlaps part of the second cell in column 404 and a third cell in column 406. In another example, individual order entry areas 436, 438 and 440 overlap aligned cells in each of the columns 402, 404 and 406.

FIG. 4D further illustrates order entry areas overlapping other elements of the trading interface 400D and aligned with the value levels of the value column. For example, an order entry area 442 encompasses multiple "Buy" elements 444 where each element 444 is aligned with a value level of the value column 404. In operation, selection within the order entry area 442 initiates placement of an order to buy a default quantity of the tradeable object. The order is at the price associated with the value level aligned with the element 444 at the location of the selection. In another example, order entry areas 446 overlay each individual "Sell" element 448, where each element 448 is aligned with a value level of the value column 404. In operation, selection of an order entry area 446 aligned with the cell in the value column 404 displaying the price "96425" results in a sell order for a default quantity being sent at the value level associated with the aligned cell.

FIG. 4E illustrates another configuration of a trading interface (identified as trading interface 400E) including order entry areas overlapping elements not aligned with the value levels of the value column. For example, an order entry area 450 encompasses multiple "Buy" elements 452a-452c configured to display different pre-set quantity levels and the currently selected price level. In operation, selection of a value level corresponding to the cell displaying the price "96300" links the selected value level with the order entry area 450. Another selection of a portion of order entry area 450 overlaying the element 452b results in a buy order for a quantity of 5 being sent at the linked price. Similarly, individualized order entry areas 454 overlaying "Sell" elements 456 may be selected to initiate placement of a sell order at a pre-defined quantity associated with the corresponding element 456 at the linked price.

VI. Example Market Data Reaction Tools and Related Methods

In operation, a trader can interact with a computing device such as the computing device 300 of FIG. 3 and, for example, the trading device 110 of FIG. 1, in order to access one or more interfaces (e.g., the interface 316 of FIG. 3) to request and review market data from the exchange (e.g., the exchange 130 of FIG. 1). Thus, an interface accessible via the trading device provides the trader with a tool for accessing and interacting with market data. In some examples, the trader subscribes to one or more market data feeds offered by the exchange (e.g., via a paid subscription). The market data feeds are transmitted from the exchange for display on the interface of the trading device over a network (e.g., the network 340 of FIG. 3) and through a gateway providing access between the trading device and the exchange (e.g., the gateway 120 of FIG. 1). Upon receipt of the data, one or more components of the trading or computing device, such as a processor (e.g., the processor 312) can process the market data for display via the interface. For example, the market data feeds contain data elements or components such as prices and contract information for one or more tradeable objects that the processor processes to populate data fields viewable via the interface.

In some examples, a trader using the trading device 110 may be interested in sharing the interface which may contain confidential or subscription market data with another trader as part of, for example, developing trading strategies based on the market data. Screen sharing provides for transmittal and replication of an interface from a first trading device to a second trading device such that the data viewable at the first trading device is substantially identically viewable at the second trading device. However, exchanges can set rules or limitations as to viewing and/or sharing the data between devices as part of, for example, paid subscriptions to the market data feeds. For example, an exchange can restrict one or more market data elements from being viewed by users who are not subscribers. Also, the exchange may restrict the number of devices on which one or more subscribed data elements can be viewed. Thus, substantially identical replication of interfaces between computing devices via screen sharing may violate one or more restrictions on accessing the subscribed market data. Additionally or alternatively, the trader using the first computing device may wish to selectively prevent certain data components from being shared with a user of another computing device. Such sensitive data can include, for example, profit and loss amounts.

Example redaction tools and related methods are disclosed herein. In particular, certain embodiments disclosed herein include a render engine that dynamically modifies interfaces in view of market data subscription rules in response to a user selection to share the interface with a second computing device. The render engine automatically identifies restricted or sensitive data components based on one or more definitions or rules and redacts the identified information prior to transmission of the interface to the second computing device. Thus, a modified copy of the interface transmitted to the second computing device complies with exchange subscription rules and/or user defined rules for sharing and viewing market data between devices.

Figure 5:
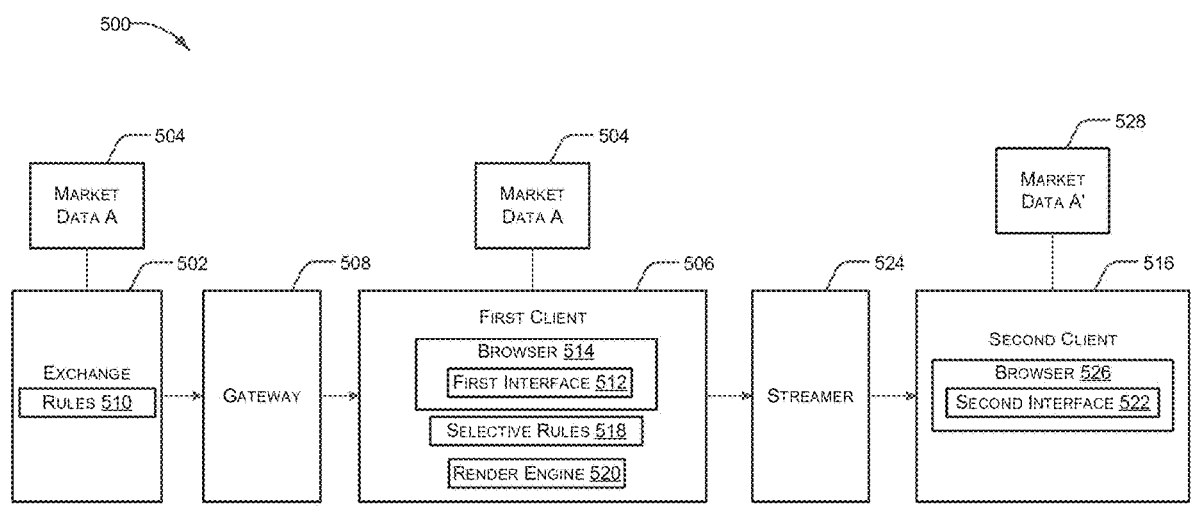
FIG. 5 illustrates a block diagram representative of an example system for selectively transmitting market data provided by an electronic exchange between trading devices.

FIG. 5 is an example system 500 for sharing market data between computing devices (e.g., trading devices). In the example system 500, the exchange 502 (e.g., the exchange 130 of FIG. 1) provides market data "A" 504 to a first client or trading device 506. The market data A 504 can include one or more data components such as price, bids, contract information, etc. for one or more tradeable objects at the exchange 502. The market data A 504 is transmitted from the exchange 502 to the first client 506 through a gateway 508 (e.g., the gateway 120 of FIG. 1), for example, over a network (e.g., the network 340 of FIG. 3).

In the example system 500, the exchange 502 may set one or more rules 510 with respect to access to the market data A 504. For example, a user of the first client 506 may be required to pay a fee or subscription to receive the market data A 504 at the first client 506. In the example system 500, the user of the first client 506 has paid a subscription fee and/or has agreed to other terms and conditions set by the exchange 502. Thus, the exchange 502 transmits the market data A 504 to the first client 506. The market data A 504 can include one or more data components, such as offer price, sale price, quantity, contract information, etc. In the example system 500, the market data A 504 is viewable via a first interface 512 of the first client 506. The first interface 512 can be an HTML page that is viewed via a browser 514 installed on the first client 506. In some examples, a processor of the first client (e.g., the processor 312 of FIG. 3) processes the market data A 504 to populate one or more data fields with the data components of the market data A 504 for display via the first interface 512.

At some point in time after the market data A 504 is received at the first client 506, a command generated by the processor 312 of FIG. 3 is received to simulcast the market data A 504 displayed on the first interface 512 at a second client or trading device 516. In other examples, a user input is received, via the first interface 512 to share or simulcast the market data A 504 displayed via the first interface 512 of the first client 506 with the second client or trading device 516.

Although a command may be received to simulcast the market data A 504 displayed on the first interface 512 of the first client 506 at the second client 516, the rules 510 set by the exchange 502 may restrict one or more data elements or components of the market data A 504 from being shared with the second client 516, for example, as part of the subscription. Additionally or alternatively, a command may be received to selectively classify certain data elements as restricted or sensitive data that are not to be shared with the second client 516. Such classifications can be defined as selective rules 518. In some examples, certain data elements are automatically selectively classified as restricted data by the first client 506 (e.g., the processor 312) based on, for example, one or more properties associated with the second client 516 (e.g., an internet protocol address of the second client 516), stored profiles including permissions associated with the second trading device 516 and/or a user of the second trading device 516 (e.g., permissions based on company affiliation, location, etc.), and/or conditional rules set by the exchange (e.g., restrictions that take affect if, for example, the second client 506 does not meet certain security measures required by the exchange for receipt of the market data). In other examples, an administrator or a user of the first client 506 can define the rules 518 providing one or more inputs via the first interface 512. For example, the user can highlight, flag, or, more generally, select one or more data components to be restricted from being shared with the second client 516. In some examples, the user defines parameters for the rules 518 via a menu or dropdown box. Parameters can include, for example, a frequency at which to restrict the selected data element (e.g., "always,"

"only if selected," etc.) or a manner in which the data should be redacted (e.g., color change, masked). In response to the user input(s), the first client 506 automatically classifies the selected data components as restricted data.

As will be further disclosed below in connection with FIG. 6, a render engine 520 identifies any exchange rules 510 and/or selective rules 518 associated with the market data A 504. The render engine 520 also identifies data elements and/or data fields (including e.g., HTML elements) of the market data A 504 associated with the exchange rules 510 and/or the selective rules 518. Based on the identification of the restricted data elements, the render engine 520 modifies the first interface 512 prior to transmission of the first interface 512 to the second client 516. In particular, the render engine 520 redacts data elements or components of the market data A 504 that are restricted or sensitive data elements based on the exchange rules 510 and/or the selective rules 518 to create a modified or second interface 522. The modified or second interface 522 is transmitted to the second client 516. In redacting and/or otherwise masking the sensitive data from the first interface 512, the render engine 520 prevents the transmission of restricted data to the second client 516, thereby ensuring compliance with the data sharing rules 510, 518 defined by the exchange 502 and/or the user of the first client 506.

After the render engine 520 modifies the first interface 512 by redacting the restricted data elements of the market data A 504 to create the second interface 522, the second interface 522 is transmitted to the second client 516 via a streamer 524. The streamer 524 can be, for example, a third party client that streams content between browsers installed on devices, such as the browser 514 installed on the first client 506 and a browser 526 installed on the second client 516. In other examples, the streamer 524 can be a server that receives the second interface 522 from the first client 506 and sends the second interface 522 to the second client 516.

Upon receipt of the second interface 522 at the second client 516, the second interface 522 can be viewed via a screen of the second client 516. For example, upon receipt of the second interface 522, the second client 516 can open a blank browser window of the browser 526 and inject the HTML elements of the second interface 522 into the browser window. As a result, the second interface 522 containing the redacted market data A 504 is displayed via the browser 526 of the second client 516.

As a result of the redaction of the market data A 504, the market data viewable via the second interface 522 is a modified version of the market data A 504. The modified or redacted market data A 504 viewed at the second client 516 can be referred to as market data A' 528. From the perspective of the user viewing the second interface 522 at the second client 516, market data A' 528 includes, for example, one less data element as compared to the market data A 504 displayed via the first interface 512 and/or alternative content (e.g., substituted or modified data content). In some examples, the second interface 522 displays a notification indicating that one or more data elements have been redacted. Also, in some examples, the second interface 522 displays a notice with information about how access to the redacted content can be obtained. However, from the perspective of the user of the first client 506, there is no change to the market data viewable via the first interface 506. Thus, the render engine 520 of the example system 500 automatically redacts sensitive data from the market data A 504 based on data sharing restrictions or limitations (e.g., the rules 510, 518) without substantially affecting the viewing experience of the user of the first client or the second client.

Figure 6:
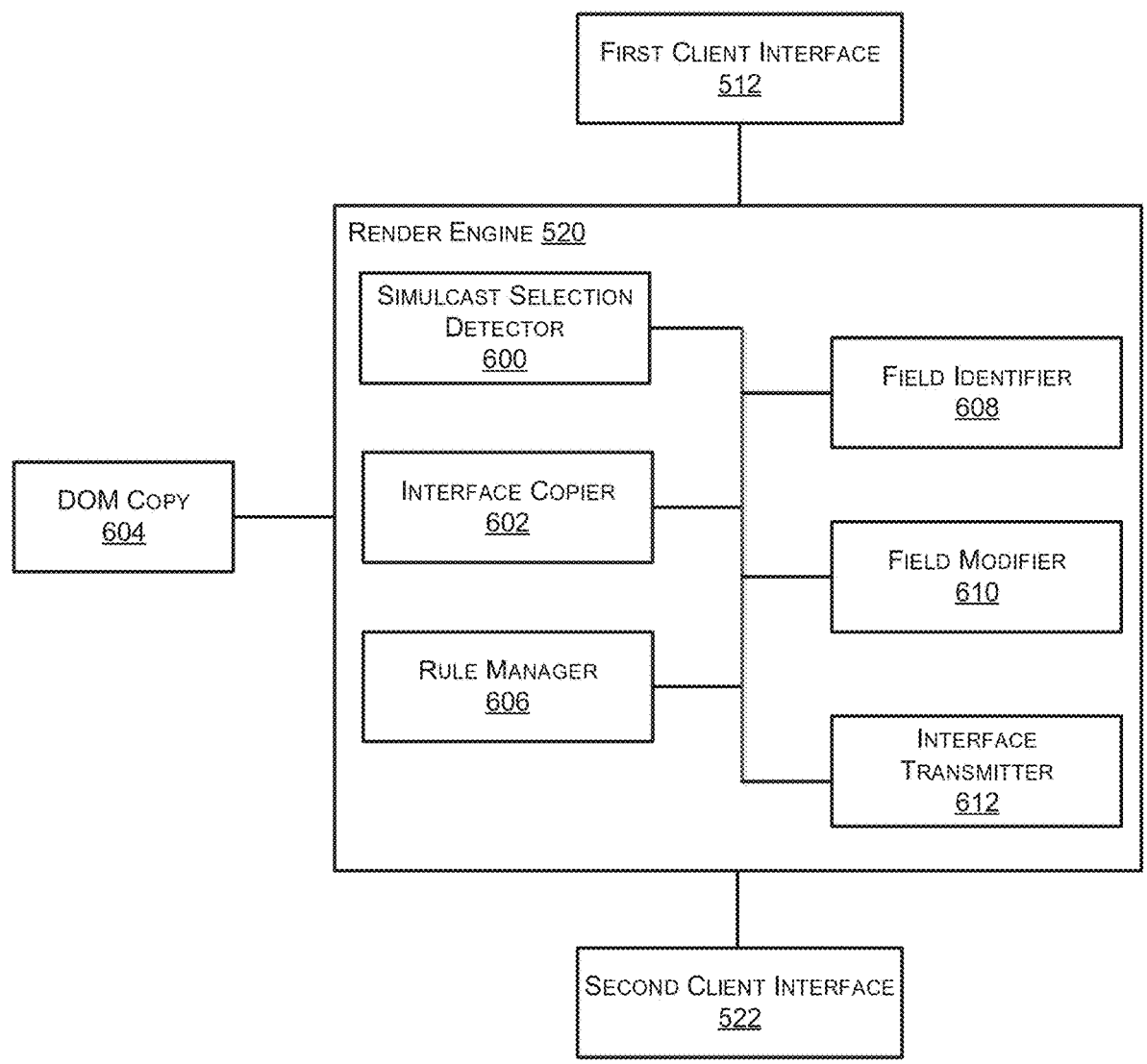
FIG. 6 illustrates a block diagram representative of an example render engine that may be used to implement the disclosed embodiments.

FIG. 6 is a block diagram of the example components of the render engine 520 of FIG. 5. The example render engine 520 prepares an interface of a first computing device, such as the first interface 512 of the first client 506 of FIG. 5, for sharing one or more other computing devices, such as the second client 516, based on one or more restrictions or limitations with respect to transferring data between devices (e.g., the exchange rules 510 and/or the selective rules 518). In some examples, the computing device (e.g., the computing device 300, 506, 516 of FIGS. 3 and 5) includes the render engine 520. For example, the render engine 520 can be associated with a processor of the computing device (e.g., the processor 312). Although the components of the render engine 520 are further disclosed below in connection with the first client 506 of FIG. 5 for illustrative purposes, the render engine 520 and/or one or more of its components can be used in connection with other client or trading devices.

The render engine 520 includes a simulcast selection detector 600. The simulcast selection detector 600 detects an input or a command (e.g., a command automatically generated by the processor 312 of FIG. 3 or a user input from a user of the first client 506) to share or simulcast the first interface 512 with the second client 516. In some examples, the user provides an input to share the first interface 512 via a GUI element on the first interface 512, such as a clickable button, a menu option, or a selection box. In other examples, the user of the first client 506 provides a command to share the first interface 512 with the second client 516 via a keyboard input such as a keystroke or a "share" button available on, for example, a keyboard of the first client device 506. In other examples, a processor of the first client 506 (e.g., the processor 312 of FIG. 3) automatically generates a command to share the interface 512 with the second client 516 if, for example, the second client 516 is detected as being on the same network as the first client 506 (e.g., per one or more device settings).

Upon detection of the user input to simulcast the first interface 512 on a screen of the second client 516 via the simulcast selection detector 600, an interface copier 602 of the render engine 520 creates a copy of the first interface 512. The example first interface 512 of FIGS. 5 and 6 includes an interface object model, such as a document object model (DOM). A DOM provides a representation of objects in an HTML document as a group of nodes organized in, for example, a tree structure to model relationships between the objects. For example, a DOM can include nodes for element objects representative of HTML elements that include attributes. The interface copier 602 of the example render engine 520 makes a copy 604 of the DOM of the first interface 512. The interface copier 602 makes a copy of the DOM in that objects in the HTML document are copied along with additional objects to which each object of the HTML document refers. In some examples, although the interface copier 602 makes the copy 604 of the DOM of the first interface 512, the DOM copy 604 is not displayed at the first client 506. Rather, the DOM copy 604 is a transfer object model generated for transmission to the second client 516. The DOM copy 604 can be stored in a memory (e.g., the memory 314 of FIG. 3).

The render engine 520 also includes a rule manager 606. The rule manager 606 identifies data sharing rules or restrictions associated with exchange subscriptions, such as the exchange rules 510 and the selective rules 518 of FIG. 5. The rules 510, 518 can include data identification information or labels for the components of the market data A that are used by the render engine 520 to recognize that one or more components of the market data A are associated with restrictions based on the rules, such as data type or content. The rules 510, 518 also include parameters or definitions that describe the restrictions on the data and/or conditions for applying the rules, such as device privacy settings. In some examples, the exchange rules 510 are transmitted to the first client 506 with the transmission of the market data A 504, for example, as one or more data elements in the market data feed. The rule manager 606 recognizes the rules associated with the transmitted market data A 504, including the rule conditions and identifying data labels contained therein. In some examples, the rule manager 606 stores one or more rules from the exchange and/or information about the data elements associated with the rules for retrieval at a time after the market data A 504 is received at the first client 506, such as when the user provides an input to share the market data A 504 with the second client 516.

In some examples, the rule manager 606 stores the selective rules 518 such that the rule manager 606 serves as a database for storing the selective restrictions placed on one or more of the data components of market data A 504 (e.g., by the user of the first client 506). For example, in response to a user input via the first interface 512 to prevent a data component such as a last traded quantity of the tradeable from being shared with the second client 516 by setting a rule 518, as will be further disclosed below in connection with FIG. 9, the rule manager 606 stores information about the rule 518, such as which data element is restricted and associated rule parameters such as the manner of redaction. In other examples, a fund administrator can define one or more rules 518 that apply to, for example, multiple trading devices associated with the fund. Also, in some examples, the selective rules 518 are automatically defined by the exchange based on one more conditions, such as security or privacy settings of a network across which the first interface 512 is transmitted and/or the second client 516.

In other examples, in response to the detection of an input or command to share the first interface 512 with the second client 516, the rule manager 606 verifies one or more user permissions or credentials with respect to the user of the second client 516 to determine whether one or more components of the market data A 504 should be restricted. For example, the rule manager 606 can identify the second device 516 as being associated with a user who is permitted to view the market data or who is restricted from viewing the market data A 504 (e.g., one or more components thereof) based on, for example, a user credential profile. Upon receipt of an input to share the first interface with the second client 516, the rule manager 606 determines whether the market data A 504 should be redacted based on the previously defined rules 510, 518. In some examples, the rule manager 606 determines if the market data A 504 should be redacted based on other definitions such as an IP address of the second client 516 or a device profile that indicates data security or privacy settings at the second client 516. Thus, in some examples, the rule manager 606 considers credentials or authorizations from the perspective of the user(s) as part of identifying the data viewing permissions.

The render engine 520 includes a field identifier 608. The field identifier 608 recognizes HTML attributes that are associated with the data elements or components identified as sensitive data based on the rules retrieved by the rule manager 606. In response to the rule manager 606 identifying that a data element in the market data A 504 is associated with an exchange- or selective rule 510, 518, the field identifier 608 scans, traverses, or parses the DOM copy 604 to search for HTML attributes that identify the data fields as containing data element or component that needs to be redacted. The field identifier 608 compares the data elements, the data fields, and/or a data type identified based on, for example, the HTML attributes, to the data identification information provided with the rules 510, 518 stored in the rule manager 606. If there is a match between the data fields or data elements identified by the field identifier 608 and the data identification information of one or more of the rules 510, 518, the field identifier 608 identifies, for example, a data field as a restricted data field. In some examples, the field identifier 608 flags the data fields or generates a list of the data fields identified as being associated with (e.g., matching) one or more of the rules 510, 518.

In some examples, the field identifier 608 recognizes the HTML attributes based on one or more known conventions or definitions for the attributes. For example, a HTML attribute can indicate that a "bid price" data field in the first interface 512 includes price information. The HTML attribute can indicate that a cell of the bid price data field includes the style "cell-formatted price." If the rule manager 606 determines that the bid price data field is a restricted data field, then the field identifier 608 searches the DOM copy 604 for HTML attributes, internal or external CSS styles and information formatted as prices to identify the bid price data field as a field containing data components that are to be redacted before the first interface 512 is shared with the second client 516. In some examples, the field identifier 608 identifies the data fields based on HTML attributes indicative of quantity (e.g., an amount of a tradeable object offered for sale). In other examples, the HTML attribute is an identifier or label that indicates that the data field is a restricted data field (e.g., an identifier or label provided by the exchange prior to transmitting the data to the client device 506). Thus, the field identifier 608 identifies the HTML elements in the DOM copy 604 that need to be redacted based on the rules 510, 518.

Based on the identification of the data fields as restricted data fields by the field identifier 608 (e.g., via the flagging of the restricted data fields by the field identifier 608), a field modifier 610 of the render engine 520 modifies the data components or content of the data field and/or modifies the HTML attributes (e.g., attributes defining a format style) of the data field. In some examples, the field modifier 610 changes a display string that contains text corresponding to a data component to be redacted. The display string can be changed to a blank string such that no text is displayed or to another string including masking characters such as "XXXXX," "#####," or "***." The field modifier 610 inserts code that causes selective text to be displayed as masking characters. For example, code such as "<span class="redacted">" where "redacted" is defined in further code as a series of asterisks can be used to replace data elements grouped or identified by a "<span>" attribute. In some examples, the field modifier 610 generates explanatory text for display (e.g., via a footnote or tooltip text) on the redacted second interface 522** that explains the meaning of the masking characters and/or provides information as to how the data can be accessed.

In some examples, the field modifier 610 changes a color associated with the restricted data field. For example, a background color indicating a last traded price can be redacted by removing a background color property identified in the HTML attribute. In other examples, the background color property can be changed to a different color. In some examples, if two or more related data fields are identified as restricted fields based on the rules 510, 518, the field modifier 610 modifies or redacts the fields in the same manner. For example, if data fields for "last traded price"

and "last traded quantity" are both restricted data fields, the field modifier 610 can remove the background color from the HTML attributes for each data field. Also, in some examples, the field modifier 610 changes a font or a font style of the restricted text by modifying the HTML attribute. The field modifier 610 can change the HTML properties for a data field to remove font style such as bold or italics, or change a font color. For example, the field modifier 610 can change or insert code such as "<span style="color:blue;font-weight:bold">" to change a font style and color to bold and blue.

Also, in some examples, the field modifier 610 modifies the data components or content of the restricted data field by replacing or substituting the content of the data field with different content. For example, although one or more data components of the real-time market data A 504 maybe restricted from being shared with the second client 516, older market data (e.g., 10 minute old market data) may be available for free. Thus, the field modifier 610 replaces the restricted real-time data, such as a real-time market price for a tradeable object, with older data, such as a market price for the tradeable object at an earlier time. In examples where the field modifier 610 replaces the real-time market data with older market data, the field modifier 610 can indicate the substitution with a text style, color, or background color change with respect to the older market data and/or the data field. Thus, the field modifier 610 transforms the market data A 504 to the market data A' 504 by redacting the restricted data fields through one or more modifications.

The field modifier 610 may also remove any non-markup elements from the DOM, including, for example, scripting and event-handler elements. For example, the field modifier 610 may remove any elements identified with attributes such as "<script> . . . </script>" present with the DOM copy 604. In this example, information, code and/or instructions identified by the <script> attributes may be removed or modified to create the DOM copy 604. The field modifier 610 removes event handlers, or code that executes in response to inputs, from the DOM copy 604, such as onclick event handlers that execute in response to a user mouse click. Thus, in addition to redacting the restricted data components by modifying one or more of the data fields, the field modifier 610 also flattens the DOM copy 604 or removes functionalities of the interface to convert the interface to a read-only mode for review and modification.

After the DOM copy 604 has been modified by the field modifier 610, the DOM copy 604 is transmitted to the second client 516. To facilitate the transmission of the DOM copy 604 to the second client 516, the render engine 520 includes an interface transmitter 612. After the field modifier 610 has redacted all of the restricted or sensitive data fields, and optionally remove the script attributes (and their associated elements) and/or the event handlers, the field modifier 610 notifies the interface transmitter 612 that the DOM copy 604 is ready to be shared with the second client 516. The interface transmitter 612 sends the DOM copy 604 to the streamer 524.

When the second client 516 receives the DOM copy 604, the second client 516 opens a blank HTML page of the browser 526. The second client 516 injects the HTML elements of the DOM copy 604 into the browser 526. In some examples, the second client 516 requests the blank page from a server that also served the DOM of the first interface 512 such that the HTML page of the browser 526 includes a copy of the HTML and/or CSS definitions used by the field identifier 608 to recognize the data fields of the market data A 504. In such examples, when sending the DOM copy 604 to second client 516, the interface transmitter 612 includes a parameter indicative of the server path for the DOM of the first interface 512. The second client 516 uses the parameter when it requests the blank HTML page. Requesting the blank HTML from the same server path allows the static GUI elements such as icons or button images to be included in the reconstructed DOM (i.e., based on the DOM copy 604 including the redactions) at the second client 516 without requiring the interface transmitter 612 to transmit the static GUI images from the first client 506 to the second client 516. As a result, the efficiency of the screen sharing between the first client 506 and the second client 516 is increased.

Thus, the example render engine 520 identifies sensitive or restricted data elements based on predetermined rules and automatically redacts the sensitive data elements prior to transmission of the first interface 512 to the second client or trading device 516. In making a copy of the DOM and modifying the copy, the render engine 520 does not interfere with the display of the first interface 512 via the first client or trading device 506. Rather, the render engine 520 obtains snapshots or frames (e.g., images) of the interface via the DOM copy, modifies the copy of the snapshot to redact the sensitive data, and sends the modified snapshot to the second client 516. Further, by injecting the modified DOM into an HTML webpage that is already associated with the HTML and/or CSS definitions of the DOM and shares the same server path, disclosed embodiments facilitate efficient reconstruction of the DOM with respect to static GUI elements such as button images without requiring transmission of the images between the first and second clients 506, 516.

In some examples, upon receipt of a command to share the first interface 512, the render engine 520 sends the DOM copy 604 with any modifications to the second client 516 for viewing as the second client interface 522 for the duration of the simulcast between the first client 506 and the second client 516. In other examples, interface copier 602 of the render engine 520 substantially continuously (e.g., for as long as the first interface 512 is being transmitted to the second client 516) makes copies of the DOM to generate transfer objects after receiving a user input via the simulcast selection detector 600 to share the first interface 512. As a result, the render engine 520 captures changes in the market data A 504 viewable via the first interface 512. In such examples, the rule manager 606, the field identifier 608, the field modifier 610, and the interface 612 substantially continuously (e.g., for as long as the first interface 512 is being transmitted to the second client 516) identify restricted data in the copies 604 of the DOM, redact the restricted data (e.g., update the redactions relative to an earlier copy of the DOM), and transmit the modified transfer objects to the second client 516. For example, if a user viewing the first interface 512 expands a column to show sensitive market data while the first interface 512 is shared at the second client 516, the interface copier 602 automatically makes another copy 604 of the DOM that includes the newly visible market data. The rule manager 606 identifies that the newly visible data is restricted data and the field identifier 608 recognizes the HTML attributes associated with the newly visible data in the new DOM copy 604. The field modifier 610 modifies the new DOM copy 604 to redact the newly visible data and the interface transmitter 612 transmits the modified copy 604 for display via the second client 516. Thus, the modified DOM copy 604 with the newly redacted data replaces or updates the second client interface 522 displayed via the second client 516. In examples where the rule manager 606 identifies that the newly visible data is not restricted data, the field modifier 610 does not redact the newly visible data and, thus, the interface transmitter 612 transmits the copy 604 with the newly visible data for display via the second client 516. Therefore, the render engine 520 generates DOM snapshots that reflect a substantially real-time stream of the first interface 512 viewable via the browser 514 of the first client 506 and that account for changes in the display of the market data A 504, including sensitive data elements thereof.

In some examples, upon receipt of a command to share the first interface 512, the rule manager 606 generates a questionnaire or tutorial (e.g., a series of click-thru screens) that, upon completion (e.g., by user of the second client 516) authorizes display of one or more sensitive data elements at the second client 516. In such examples, the interface transmitter 612 transmits the tutorial before transmitting the DOM copy 604. Based on the credentials established via the tutorial, the field modifier 610 modifies the DOM copy 604 accordingly. In some examples, the rules manager 606 generates the tutorial during a simulcast of the first interface 512 with the second client 516 if, for example, newly visible data is revealed at the first client 506. Based on the tutorial, the field modifier 610 can update and/or change the masking of the market data during the simulcast in accordance with any updated or new data sharing credentials or authorizations. Also, in some examples, changes in the redaction of data and/or sharing authorizations during a simulcast are reported to the exchange 502 by the rule manager 606.

Figure 7:
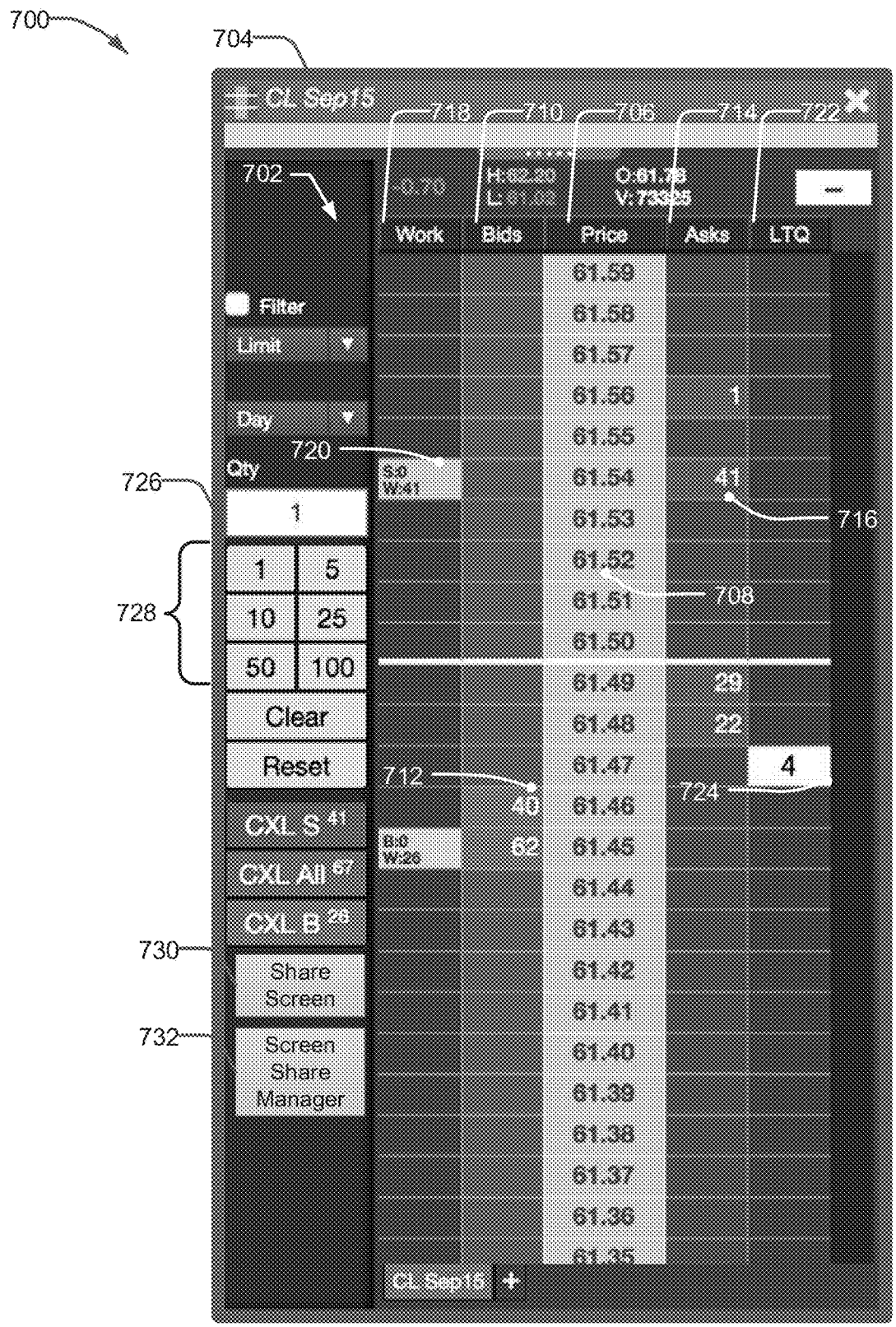
FIG. 7 illustrates a first display configuration of an example interface that may be used to implement the disclosed embodiments.
Figure 8:
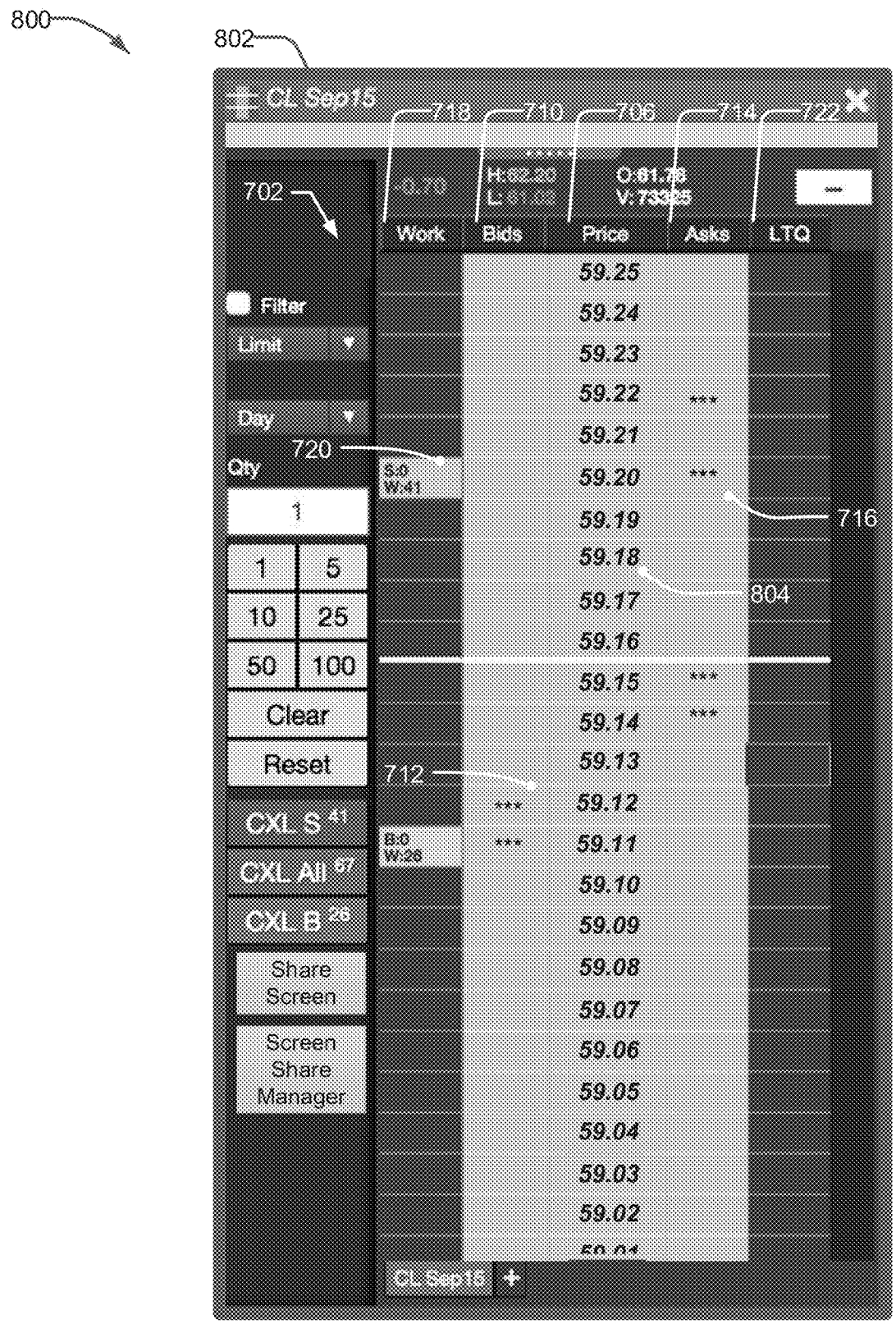
FIG. 8 illustrates a second display configuration of the example interface of FIG. 7 that may be used to implement the disclosed embodiments.

FIG. 7 illustrates a first display configuration 700 of an example interface 702 for viewing on a screen 704 of a first trading device (e.g., the first client 506 of FIG. 5). FIG. 8 illustrates a second display configuration 800 of the example interface 702 for viewing on a screen 802 of a second trading device (e.g., the second client 516 of FIG. 5) in which one or more data elements have been redacted relative to the interface 702 viewed via the screen 704 of FIG. 7. The example interface 702 in the first display configuration 700 of FIG. 7 and the redacted version of the example interface 702 in the second display configuration 800 of FIG. 8 are visible on the respective screens 704, 802 of FIGS. 7 and 8 at substantially the same time (e.g., at a given moment in time, the example interface 702 in the first display configuration 700 and the example interface 702 in the second display configuration 800 are each viewable at the respective screens 704, 802). In some examples, a render engine such as the render engine 520 of FIGS. 5 and 6 modifies the first display configuration 700 of the example interface 702 of FIG. 7 to obtain the second display configuration 800 of the example interface 702 illustrated in FIG. 8.

As illustrated in FIG. 7, the example interface 702 displays market data for a tradeable object such as, for example, futures contracts for crude oil that expire in September 2015. The example interface 702 of FIG. 7 includes, for example, five data columns populated with market data components, namely, a value column 706 displaying prices 708, a bid column 710 displaying a number of contracts 712 bid at each price 708 in the value column 706, an ask column 714 displaying a number of contracts 716 offered at each price 708 in the value column 706, a working order column 718 displaying one or more orders 720 to buy or sell the contracts 712, 716 at a respective price 708 in the value column 706, and a last traded quantity (LTQ) column 722 displaying the last traded quantity 724 for an order bought or sold at a respective price 708 in the value column 706. In some examples, the value column 706, the bid column 710, the ask column 714, the working order column 718, and the LTQ column 722 correspond to the respective the bid column 402, the value column 404, the ask column 406, the working order column 480, and the LTQ column 410 of FIGS. 4A-E. The example interface 702 can display market data for other tradeable objects and/or for other commodities and can include fewer or additional data columns. The example interface 702 can also include one or more other features as disclosed, for example, in connection with FIGS. 4A-E, such as a quantity field 726 (e.g., corresponding to the quantify field 420 of FIG. 4A) and buttons 728 for adjusting or entering quantities in the quantity field 726 (e.g., corresponding to the buttons 422 of FIG. 4A).

The example interface 702 also includes a share button 730 (e.g., a button, dropdown menu, checkbox, or other user input selection) which, upon selection, triggers simulcasting of the example interface 702 with the second trading device. In some examples, user selection of the share button 730 triggers a render engine associated with the first trading device (e.g., the render engine 520 of FIGS. 5 and 6) to determine if any of the market data components displayed in via the first display configuration 700 of the example interface 702 of FIG. 7 are associated with data sharing restrictions, such as the values of bid and ask quantities 712, 716 in the respective the bid column 710 and the ask column 714, the prices 708 in the value column 706, and the LTQ 724 in the LTQ column 722.

For example, the values of the bid and ask quantities 712, 716, the prices 708, and the LTQ 724 are provided by an exchange (e.g., the exchange 502 of FIG. 5). The market data displayed via the example interface 702 can be provided by the exchange as part of a subscription that allows a user to view the market data components 706, 712, 716, 724 without restrictions (i.e., all of the market data elements 706, 712, 716, 724 are visible in the first display configuration 700). However, one or more of the market data components 706, 712, 716, 724 may be associated with restrictions that prevent the one or more market data components 706, 712, 716, 724 from being shared with users and/or devices. The data sharing restrictions can be defined by rules with respect to, for example, data subscriptions offered by the exchange, user permissions, administrative settings, and/or device settings.

As disclosed above, the one or more market data components 706, 712, 716, 724 are identified as restricted data based on HTML attributes associated with the HTML code underlying the example interface 702. For example, the interface copier 602 makes a deep copy of the example interface 702 that is not displayed. The field identifier 608 traverses the copy of the example interface 702 and identifies the HTML attributes associated with, for example, the bid quantities 712, which indicate that the bid column 710 includes numerical data related to quantities. The field identifier 608 identifies the prices 708 based on HTML attributes indicating that the numerical values in the value column 706 are in a price format. Based on the information associated with the rules 510, 518 stored in the rules manager 606, the field identifier 608 identifies the one or more market data components 706, 712, 716, 724 as restricted data components based on, for example, HTML attributes or labels identified by the field identifier 608 matching data types identified as restricted in one or more of the rules 510, 518. For example, the field identifier 608 communicates with the rules manager 606 to determine whether the HTML attributes indicating that the bid column 710 includes numerical values indicative of bid quantities 712 match any restrictions defined by the rules 510, 518. In the example of FIG. 7, the HTML attributes for the bid quantities 712 match a rule that requires data identified by HTML attributes indicative of bid quantities to be redacted, or not shared with another trading device when the share screen button 730 is selected. The field identifier 608 flags the bid quantities 712 as restricted data elements requiring modification by the field modifier 610. As illustrated below in FIG. 8, the bid quantities 712 are redacted in the second display configuration 800 of FIG. 8.

In some examples, one or more of the market data components 706, 712, 716, 724 are associated with data sharing restrictions based on selective or conditional rules, which can be defined by a user of a trading device, a fund administrator, the exchange, etc. FIG. 7 illustrates an example in which a user of the first trading device can define rules with respect to data sharing between devices. To define the restrictions or rules, the example interface 702 also includes a screen share manager button 732 (e.g., a button, dropdown menu, checkbox, or other user input selection). Upon selection of the screen share manager button 732 by the user, a dropdown menu or window opens to allow the user to define certain restrictions or rules with respect to the market data components 706, 712, 716, 724.

Figure 9:
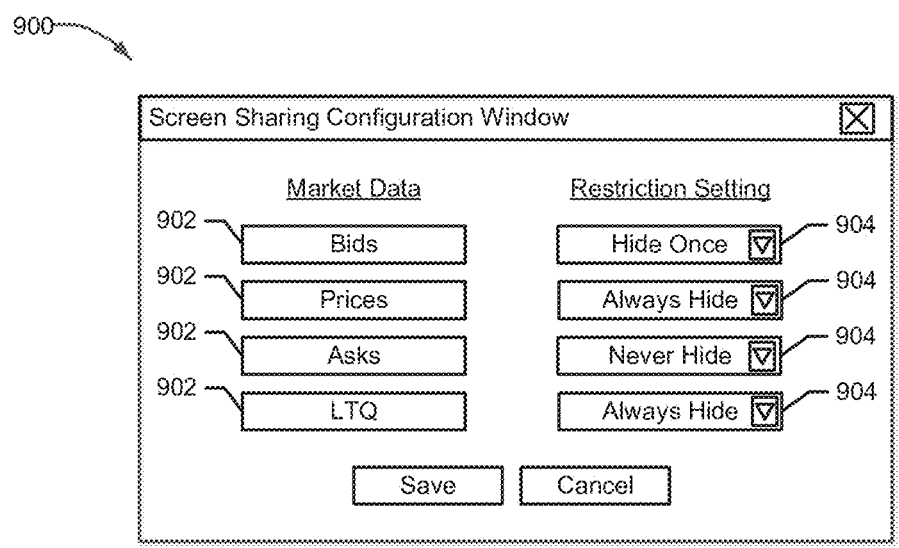
FIG. 9 illustrates an example screen sharing configuration interface for defining data rules that may be used to implement the disclosed embodiments.

FIG. 9 illustrates an example screen sharing configuration window 900 that can be displayed or accessed upon selection of the screen share manager button 732 of FIG. 7. As shown in FIG. 9, the example screen sharing configuration window 900 displays names of the market data components 706, 712, 716, 724 in respective listings 902. The example screen sharing configuration window 900 also includes restriction setting menus 904 for each respective listing 902. In the example screen sharing configuration window 900, the restriction setting menus 904 are dropdown menus through which a user defines which market data components 706, 712, 716, 724 are to be prevented from being shared with the second trading device. For example, a user can choose to always hide certain market data components when the share button 730 is selected, to selectively hide certain market data (e.g., "hide once"), or to never hide the market data. In other examples, the restriction setting menus 904 are checkboxes or "+/−" buttons that can be manipulated to allow or prevent the market data from being shared. Based on the restriction settings defined via the screen sharing configuration window 900, the market data components 706, 712, 716, 724 are redacted from being displayed in the simulcast of the example interface 702 on the second trading device. In some examples, the restriction settings defined via the screen sharing configuration window 900 are stored in a rule manager (e.g., the rule manager 606 of FIG. 6) for retrieval upon selection of the share button 730 as part of identifying the restricted market data components 706, 712, 716, 724 for redaction (e.g., via the field identifier 608 of FIG. 6). In some examples, the rule manager provides for hierarchical organization of the rules so that user-defined rules do not override the rules set by the exchange.

Referring now to FIG. 8, the example interface 702 of FIG. 7 is illustrated in a redacted form, or second display configuration 800, for viewing via the screen 802 of a second trading device at substantially the same time as the example interface of FIG. 7 is viewable via the screen 704 of FIG. 7. As illustrated in FIG. 8, the market data components 706, 712, 716, 724 have been redacted or modified in the second display configuration 800 as compared to the first display configuration 700 of FIG. 7 based on identification of the data components 706, 712, 716, 724 as being associated with rules (e.g., via the HTML attributes or labels of the data components as identified by the field identifier 608 and the rule manager 606). In some examples, the modifications were performed by a field modifier (e.g., the field modifier 610 of FIG. 6) prior to being transmitted from the first trading device to the second trading device (e.g., via the interface transmitter 612 of FIG. 6). Also, the functionalities of features such as the share button 730 may not be active in the second display configuration 800 of FIG. 8 so as to maintain control by the user of the first trading device over the interface. Thus, the redacted or modified example interface 702 is in a "read-only" mode relative to the second trading device.

For example, as illustrated in FIG. 8, the background coloring of the bid column 710 and the ask column 714 have been removed such that the value column 706, the bid column 710, and the ask column 714 are substantially the same color. Also, in the second display configuration 800, the numerical values of the bid and ask quantities 712, 716 have been replaced with asterisks. For example, in the first display configuration 700 of FIG. 7, the example interface 702 displays an ask quantity of 1 at a price of $61.56 and an ask quantity of 41 at a price of $61.54. In the second display configuration 800 of FIG. 8, the ask quantities have been replaced with asterisks. Similarly, in the first display configuration 700 of FIG. 7, the bid quantities of 40 and 62 at the respective prices of $61.46 and $61.45 have been replaced with asterisks. Thus, the values of the bid and ask quantities 712, 716 are not visible to the user viewing the second screen 802. Also, the values of the LTQ are not displayed in the LTQ column 722. Thus, the LTQ value 724 visible in LTQ column 722 in the first display configuration 700 is not visible in the second display configuration 800. To implement the modifications to the first display configuration 700 of FIG. 7, the field modifier 610 inserts and/or revises code in the DOM copy of the example interface 702 defining the data style, content, etc. of the restricted data components. In such a manner, the field modifier 610 generates the second display configuration 800 illustrated in FIG. 8 displaying the modified market data (e.g., the market data A' 528 of FIG. 5).

Also, in FIG. 8, the prices 708 displayed in the value column 706 have been replaced with substitute prices 804. The substitute prices 804 can be, for example, prices for the tradeable object at an earlier time than the substantially real-time prices 708 displayed in the first display configuration 700 of FIG. 7. As shown in FIG. 8, the substitute prices 804 are lower than the real-time prices 708 of FIG. 7 based on market conditions at the exchange at an earlier time (e.g., 30 seconds earlier than a current time, 10 minutes earlier than a current time). For example, while the real-time prices 708 displayed in the first display configuration 700 are restricted by the exchange from being simulcast to other devices, the substitute prices 804 may be provided by the exchange without restrictions (e.g., without requiring a paid subscription). In some examples, the substitute prices 804 are received from the exchange (e.g., the exchange 502 of FIG. 5) and used by the field modifier 610 to replace the real-time prices 708.

To indicate that the substitute prices 804 of FIG. 8 are not real-time prices, the format style of the substitute prices 804 is different than the format style of the prices 708 of FIG. 7. For example, the substitute prices 804 of FIG. 8 are displayed as italicized text, whereas the prices 708 of FIG. 7 are not italicized. Other format style changes (e.g., color, boldness) can be used to distinguish between the prices 708 of FIG. 7 and the substitute prices 804 of FIG. 8. In some examples, mouse-over text, footnotes, or characters such as asterisks can be used to identify the prices as the substitute prices 804.

Also, as illustrated in FIGS. 7 and 8, the orders 720 in the work column 718 have not been modified and, thus, are visible in each of the first display configuration 700 and the second display configuration 800. The orders 720 of the work column 718 may be not associated with any restriction rules and/or conditions for selective masking of the orders 720 may not have been met and, thus, the orders 720 are not modified. In such examples, the field modifier 610 does not modify the code associated with the orders 720 in the DOM copy of the example interface 702.

Thus, FIGS. 7 and 8 illustrate an example interface that is visible on screens of two trading devices at substantially the same time, but that includes one or more market data components that are selectively redacted between the interfaces. Upon receipt of a user input to share the interface between devices, the identification of restricted market data and redacted of the restricted market data is performed automatically based on the data sharing rules defined by the exchange. In some examples, the redaction of market data is triggered by one or more user-defined rules via, for example, the screen sharing configuration window of FIG. 9. Thus, the example embodiments disclosed herein provide for sharing of an interface between devices that complies with exchange rules while providing for user inputs to further restrict data based on user preferences. Further, the modification of the interface transmitted for display on the screen of the second device does not impact the data displayed via the first device and, thus, the user who initiated the screen sharing continues to view the market data associated with the exchange subscription without redaction.

Figure 10:
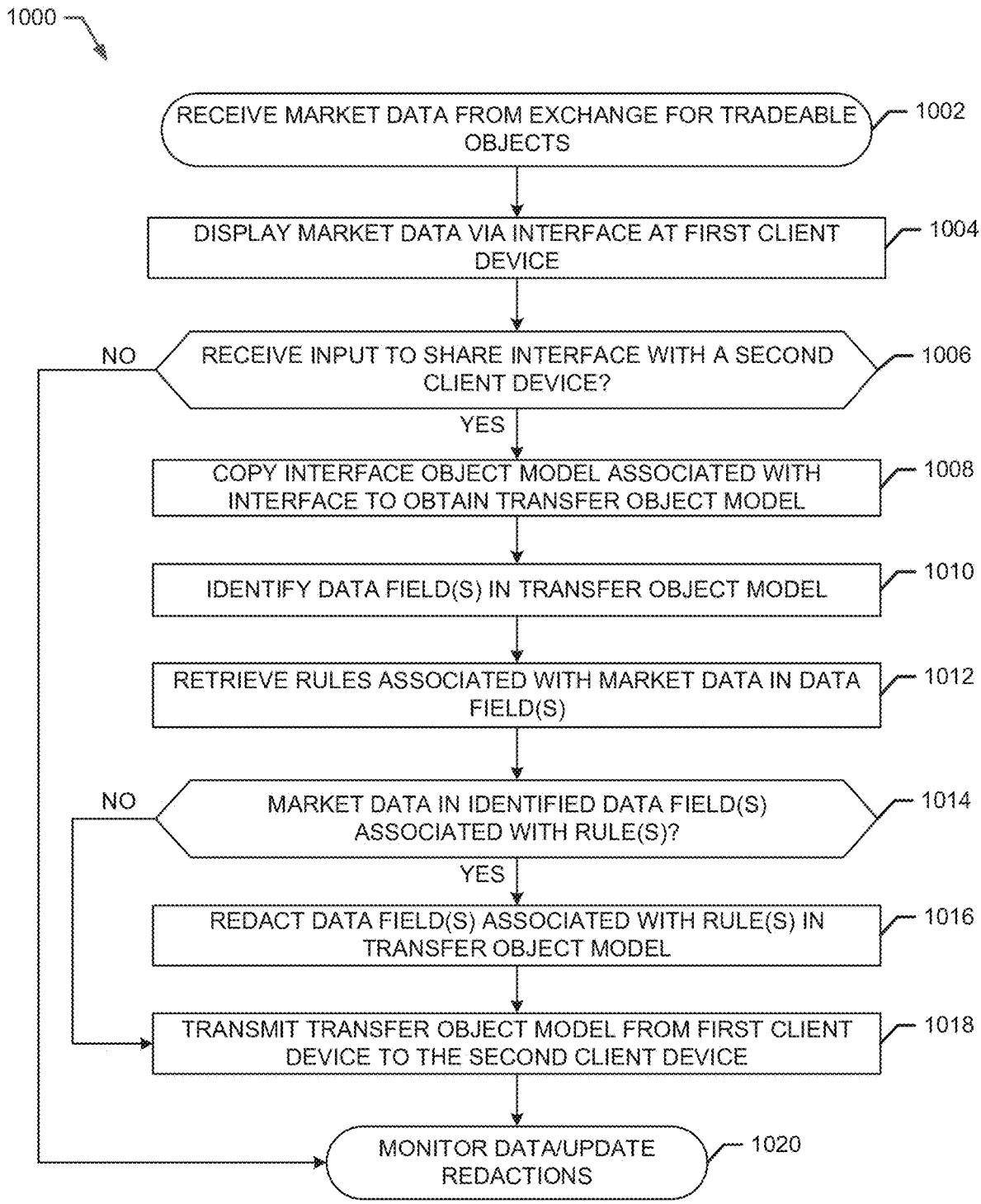
FIG. 10 illustrates a flowchart representative of example machine readable instructions that may be executed to implement disclosed embodiments.

FIG. 10 depicts a flow diagram of an example method 1000 for redacting one or more data components displayed via a graphical user interface (e.g., the interfaces 512, 702 of FIGS. 5 and 7) at a first client device (e.g., the first client 506) prior to the transmission of the interface for substantially simultaneous viewing at a second client device (e.g., the second client 516). The example method 1000 begins with receiving market data (e.g., the market data A 504 of FIG. 5) from an exchange, such as the exchange 502 of FIG. 5 (block 1002). The market data, which includes data for one or more tradeable objects, is displayed via an interface at a first client device or trading device (block 1004).

In some examples of the method 1000 of FIG. 10, an input is received to share or simulcast the interface displayed via the first client device with a second client device (block 1006). The input can be received via, for example, a "screen share" button such as the share button 730 of FIG. 7 or can be a command generated by a trading device in response to detecting another trading device on a network. The input can be detected by, for example, the simulcast selection detector 600 of the render engine 520 of FIGS. 5 and 6. If an input to share the interface is not received, the example method 1000 includes continuing to display the market data received from the exchange via the interface.

If an input is received to share the interface with another client or trading device, the example method 1000 includes copying an interface object model associated with the interface (block 1008). The interface object model can be, for example, a document object model (DOM). A copy of the DOM (e.g., the DOM copy 604 of FIG. 6) can be generated to create a transfer object model for modification and transmission to the second trading device. In some examples, the copy of the interface object model is generated by the interface copier 602 of the render engine 520 of FIGS. 5 and 6. The interface copier 602 makes a deep copy of the DOM that is not displayed via the first or second client devices.

The example method 1000 includes identifying one or more data fields in the transfer object model (block 1010). The data fields include, for example, price fields or contract information fields related to the tradeable object(s) included in the market data such as the data fields can be the bid column 710, the ask column 714, the value column 706, and/or the LTQ column 722 of FIG. 7. In the example method 1000, the one or more data fields can be identified by the field identifier 608 of the render engine 520 of FIGS. 5 and 6 based on, for example, HTML attributes associated with the data fields (e.g., price formatted data cells).

Upon identification of the data fields in the transfer object model, the example method 1000 includes retrieving one or more rules associated with the market data components in the data fields (block 1012). The market data components can be, for example, one or more of the values of the bid and ask quantities 712, 716 in the respective the bid and the ask column 714, the prices 708 in the value column 706, and/or the LTQ 724 in the LTQ column 722 of FIG. 7. The rules can be retrieved by, for example, the rule manager 606 of the render engine 520 of FIG. 6. The rules can be defined by, for example, the exchange as part of market data subscription. Exchange-defined rules can limit the sharing of the market data with one or more trading devices. In some examples, the rules are defined by a user or administrator of the first trading device (e.g., via the screen share manager button 732 and configuration window 900 of FIGS. 7 and 9) or selectively defined by the exchange if certain conditions are met, such as whether the security settings of the second client device comply with the security settings required by the exchange for receiving market data. The conditional rules can selectively hide or prevent one or more market data components from being shared with the second trading device based on, for example, user or administrator preferences.

The example method 1000 includes a determination of whether the market data components of the identified data fields are associated with one or more rules or restrictions (block 1014). If, for example, the rule manager 606 detects that one or more components of the data fields identified by the field identifier 608 are associated with data sharing restrictions, the example method 1000 continues with redacting or modifying the data fields in the transfer object model containing the market data associated with the rules (block 1016). In some examples, the redacting is performed by the field modifier 610 of the render engine 520 of FIG. 6. For example, the field modifier 610 modifies the text of the data fields and/or modifies the CSS style of the data fields by inserting or altering the code associated with the CSS style attributes to prevent the restricted market data from being viewed at the second client device. Example modifications include masking the data or replacing the data with older (i.e., not real-time) data as illustrated in the example display configuration 800 of FIG. 8 in which certain data elements have been redacted (e.g., the bid quantities 712) or substituted (e.g., the prices 708) as compared to the display configuration 700 of FIG. 7. Thus, after the redaction of the market data in the data fields of the transfer object model, the interface generated by the example method 1000 (e.g., the second interface 522 of FIG. 5) contains modified market data (e.g., the market data A' 528 of FIG. 5).

The transfer object model containing the modified market data is transmitted from the first client device to the second client device (block 1018). In some examples, the transfer object model is transmitted via the interface transmitter 612 of the render engine 520 of FIG. 6. The transfer object model can be streamed via, for example, a third party streaming service, to the second client device.

If a determination is made that the market data is not associated with any rules (block 1014), the example method 1000 continues with transmitting the transfer object model for streaming to the second client device (block 1018). Thus, in some examples, if there are no data sharing restrictions for the market data, the transfer object model is transmitted to the second client device without any modifications. The example method 1000 monitors the market data received from the exchange to identify whether newly received market data is associated with data sharing restrictions and updates the transfer object model accordingly by, for example, redacting newly received data in subsequent copies of the interface object model (block 1020).

Thus, in response to a user input to share an interface with another device, the example method 800 automatically identifies market data associated with data sharing restrictions displayed via the interface and redacts the market data in accordance with the restrictions or rules. The automatic copying of the interface, identification of the rules, and modification of the copy based on the rules provides for efficient sharing of interface between trading devices that complies with one or more exchange- or user-defined rules. The example method 1000 substantially continuously monitors the market data displayed via the interface at the first trading device to identify data sharing restrictions and redact the transfer model object accordingly as part of providing a live stream of the interface between trading devices.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method including:
receiving market data related to a plurality of tradeable objects offered at an electronic exchange at a first computing device;
generating an interface provided by an interface server in communication with the first computing device, wherein the interface is generated according to an interface object model managed by the interface server and including a plurality of data components corresponding to the received market data;
displaying the interface generated at the first computing device in a window of a browser according to the interface object model;
detecting an input selection to share the interface with a second computing device in communication with the first computing device;
in response to the detected input selection, generating by a render engine operating at the first computing device a transfer object model as a copy of the interface object model, wherein the transfer object model represents the current configuration of the interface generated at the first computing device;
automatically redacting by the render engine at least one data component within the generated transfer object model managed by the interface server to generate a redacted transfer object model, wherein the automatically redacted at least one data component corresponds to a restricted data component;
transmitting the redacted transfer object model from a streamer in communication with the first computing device to the second computing device in communication with the first computing device and the interface server; and
simulcast utilizing the streamer a redacted copy of the interface provided by the interface server in a second browser implemented at the second computing device according to the redacted transfer object model.

2. The method of claim 1, wherein the interface object model is a document object model.

3. The method of claim 1, wherein the restricted data component is a paid subscription data defined by a user associated with the first computing device.

4. The method of claim 1, wherein redacting the at least one data component comprises at least one of changing a presentation style of the at least one data component or replacing the at least one data component with a second data component.

5. The method of claim 4, wherein the presentation style includes changing the color of the at least one data component.

6. The method of claim 4, wherein the presentation style includes masking the at least one data component.

7. The method of claim 1, wherein the render engine includes at least one rule associated with the received market data.

8. The method of claim 1, further comprising verifying an authorization level of a user associated with the second computing device with respect to the at least one data component prior to the redacting.

9. The method of claim 1, wherein the at least one data component comprises at least one of price data, quantity data, contract information data, profit amount data, or loss amount data.

* * * * *